March 3, 1970  R. M. BOWERS  3,498,584
BUTTERFLY VALVE
Filed April 17, 1968  2 Sheets-Sheet 1
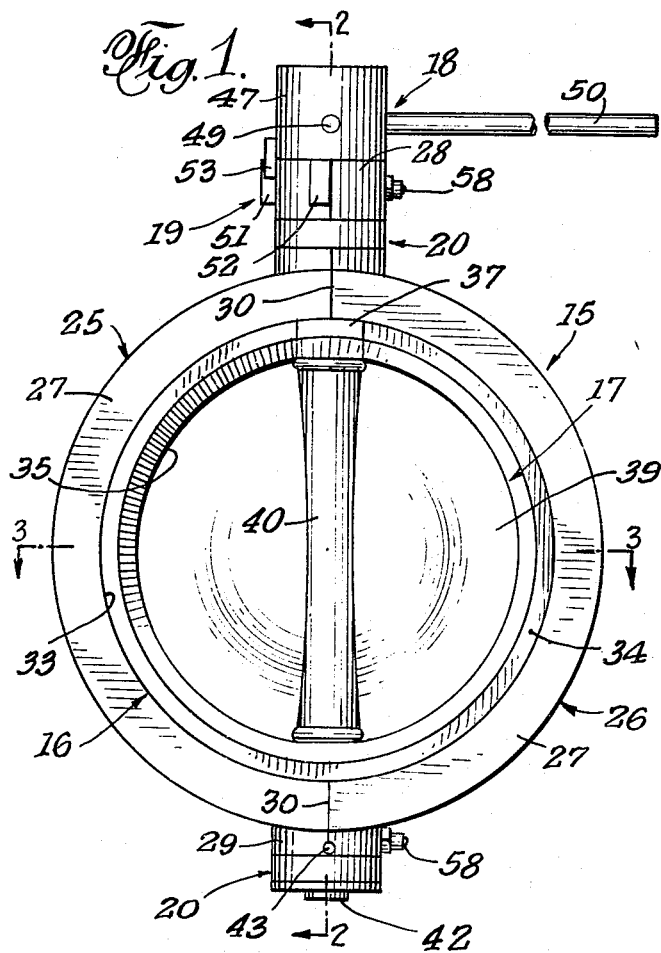
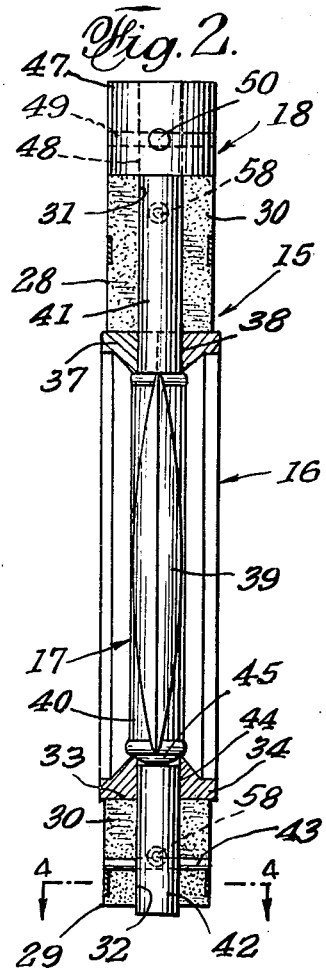
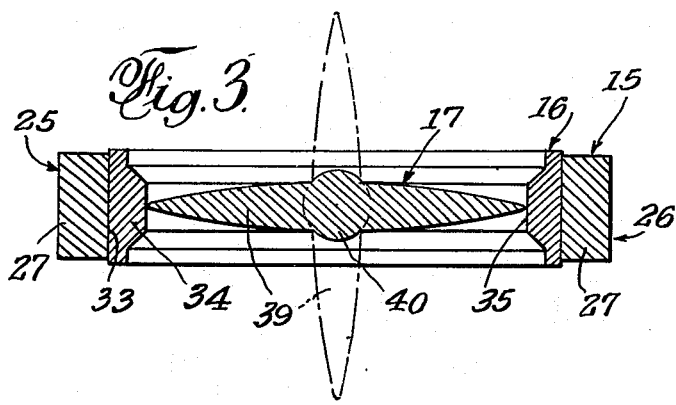
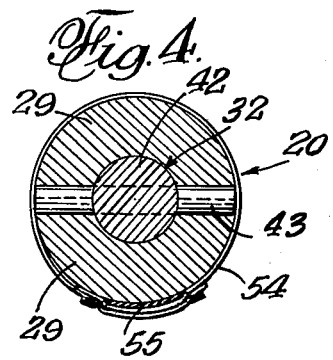
INVENTOR.
RUDOLPH M. BOWERS
BY
Hyman Jackman
ATTORNEY

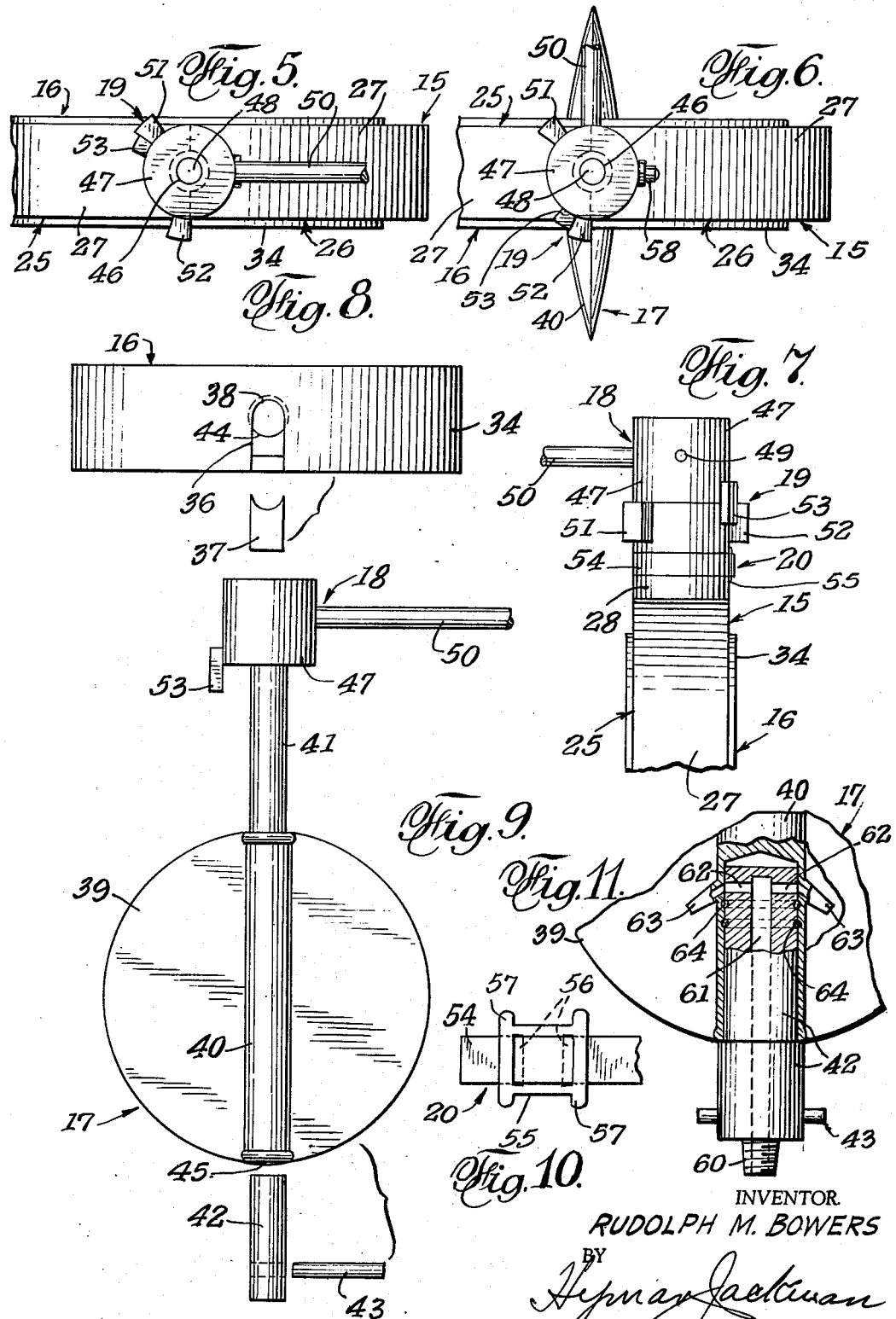

United States Patent Office
3,498,584
Patented Mar. 3, 1970

3,498,584
BUTTERFLY VALVE
Rudolph M. Bowers, 4247 W. 88th St.,
Anchorage, Alaska 99502
Filed Apr. 17, 1968, Ser. No. 722,025
Int. Cl. F16k 1/22, 51/00
U.S. Cl. 251—305    8 Claims

ABSTRACT OF THE DISCLOSURE

A butterfly valve having a circular body of two semi-circular parts having oppositely extending axial projections that are separably joined by band clamps, an annular seat lining the circular opening of the body and defining a flow passage, a flow-controlling disc in said flow passage provided with an integral axial stem extending through the adjacent portion of the seat and through an axial bore in one of said body-part projections with a throttling handle on an axial projection of said axial stem with stop indicators on the latter axial projection of the body parts to limit the angular adjustment of the disc in the flow passage, and a separate axial stem in an axial bore in the other body-part projection and engaged with the adjacent portion of the mentioned seat.

BACKGROUND OF THE INVENTION

The present butterfly valve is devised primarily for the oil field and has proven its superiority to other valves in the same line of work. Simplicity and sturdiness of design and construction are primary characteristics of the present valve in that the highly abrasive and corrosive muds and fluids, gases and chemicals passing through the valve cannot penetrate to any of the working parts thereof except those provided to pass and limit the flow. The results is lower operating costs and less frequent replacement of parts. Whereas other valves of this kind either must be discarded when worn, or require many hours for repair and replacement of parts, under actual field conditions the present valve may be restored to efficient condition of use in fifteen to twenty minutes, certainly in less than half an hour.

It is an object of the invention to provide a butterfly valve having the mentioned characteristics.

Other objects of the invention are to provide a valve as characterized that seals equally well against flow pressure from either direction; provides lubrication for the disc and its stems and which is sealed from the material flowing through the valve; and has exposed means to visually reveal the flow-controlling set position of the disc.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, preferred embodiments of the present invention, which are given by way of illustration or example only.

SUMMARY OF THE INVENTION

The butterfly valve of the present invention comprises, generally, a two-part body 15 adapted to be connected in a pipe line in any of the various ways that connection is effected, a disc valve seat 16, a valve disc 17 disposed within said seat and rotationally mounted in said body, a throttling handle 18 for rotatively adjusting the flow-controlling position of the disc in said seat, indicator means 19 to visually reveal the adjustment, and means 20 to separably connect the body parts.

BRIEF DESCRIPTION OF THE DRAWINGS

In the drawings, like reference characters designate similar parts in the several views.

FIG. 1 is a face view of a butterfly valve according to the invention.

FIG. 2 is a vertical sectional view as taken on the line 2—2 of FIG. 1.

FIG. 3 is a cross-sectional view as taken on the line 3—3 of FIG. 1.

FIG. 4 is an enlarged cross-sectional view as taken on line 4—4 of FIG. 2.

FIG. 5 is a broken plan view of the valve in closed position.

FIG. 6 is a similar view of the valve in open position.

FIG. 7 is a broken side view of the valve as in FIG. 6.

FIG. 8 is a top view of a valve seat in the assembly.

FIG. 9 is a front view of a valve disc and stems used in the assembly.

FIG. 10 is an enlarged and broken view of a band clamp.

FIG. 11 is a fragmentary detail view of a modification.

DESCRIPTION OF THE PREFERRED EMBODIMENTS

The body 15 comprises two similar parts 25 and 26, each having a semi-circular part 27 and diametrally oppositely extending bearing parts 28 and 29, the former of which is longer than the latter. FIG. 2 shows that said parts 27, 28 and 29 have a common plane surface 30, and FIG. 1 shows that said surfaces 30 meet along a plane that extends through the center of the body 15 when the parts 25 and 26 thereof are in assembly. A bearing bore 31 in the assembled bearing parts 28 of the body 25 and an aligned bearing bore 32 in the assembled bearing parts 29 constitute an axial bore for the butterfly disc 17. The inner semi-circular surface 33 of each body part 27 forms a bore in the body.

The disc valve seat 16 comprises an annulus 34 of a size to fit the bore 33 and has an inner bore 35 which constitutes the flow passage of the valve. A notch 36 is provided in said seat and an insert 37 is fitted into said notch. A hole 38 is formed where the insert 37 is provided, the same forming an inner extension of the bearing bore 31, as shown in FIG. 2.

The valve disc 17 comprises a paddle 39 of a size to fit the bore 35 and to seal against flow therethrough when disposed in the plane of the seat 16; a central thickened portion 40 of the disc is on the axis of said paddle; and an axle 41 extends from one end of said portion 40 through the hole 38 and the bore 31 and beyond the end of the bearing part 28. It will be seen that the axle 41 locates the seat 16 in the body 25 at one end. At the opposite end of the body, a stem 42, fitted into the bore 32, is fixed in place in the body bearing 29 by a cross pin 43 and extends into a hole 44 in the annulus 34 that is coaxial with the hole 38 in said annulus. The end of the portion 40 of the disc 17 that is diametrically opposite to the stem 41 is provided with a pilot extension 45 that fits said hole 44, thereby providing the disc 17 with a steadying support at the end opposite to the stem 41.

The handle 18, as shown in FIGS. 5 and 6, may have a bore 46 in he hub 47 thereof for an extension 48 of the stem 41. A cross pin 49 connects the handle to said extension and can be removed so the handle can be removed after the valve disc has been set to desired position, thereby rendering the valve substantially tamper-proof and normally operable only after the handle is replaced on the stem and the leverage of the extension 50 is available. FIG. 9 shows a simplified structure in which the handle hub 47 and the stem 41 are integral.

The indicator means 19 is shown as circumferentially spaced stop lugs 51 and 52 on the bearing part 28 of one body part, in this case the part 25, and a lug 53 on the handle hub 47 and extended to be between the stop lugs 51 and 52 to engage one or the other at the limits of adjusted positions of the valve disc 17. One position, shown in FIG. 1, 2, 3, and 5, is the flow-stopping position; and the other position, shown in FIGS. 6 and 7, is the full-open position. The valve may be set to positions in between.

The means 20 is shown as a band clamp that is detailed in FIG. 10 and is applied to connect the bearing parts 28 and 29, which may be grooved so that bands 54 may non-displaceably fit therein. A slotted banding body 55 with slots 56 for the band after the band has been tightened around said bearing parts, may have its upper and lower lugs 57 folded over onto the band to retain the tightened condition.

By providing the faces 30 with a thin coating of rubber, the seams formed thereby when the band means 20 is applied insure a seal between the body parts or halves and prevention of material penetrating therebetween.

Conventional lubricating fittings 58 provide means for supplying grease-type lubricant to the stem 41 and its bearing and the bearings of the separate non-rotational stem so lubricant may reach the pilot extension 45.

Assembly of the valve is simple. The valve disc 17 is laterally slipped into the seat 16 and the stem 41 into the hole 38. Then the insert 37 is put into place in the seat. The seat is then assembled laterally into one of the body halves. Now, the stem 42 is assembled to hold the disc 17 in place and the other body half is placed in assembly with the first half. The band means 20 is then applied to complete the assembly. In cases where the handle is affixed by a pin, the same may be applied last.

In the modification shown in FIG. 11, means is shown for blowing air or water, i.e., fluid, through the lower stem 42 into the interior of the pipe line to prevent viscous or clogging fluids or muds from getting inside the paddle 39. To this end, a nipple 60 for connection to a fluid hose is provided on the end of the stem 42 to conduct flushing fluid to a bore 61 in said stem and branch ports 62 when the paddle is in open position, as in FIG. 11, and discharge such fluid through check valve jets 63. Said jets may be provided one on either side of the paddle, and serve the purpose of keeping the paddle bearing clear of clogging material. Sealing rings 64 seal between the stem 42 and the bore into which the same extends.

Having thus described the invention, what is claimed and desired to be secured by Letters Patent is:

1. A butterfly valve comprising:
   (a) a two-part body, each part having a semi-circular part, diametrally oppositely directed bearing parts, each semi-circular part having an inner similarly shaped face and each bearing part having half a bearing bore therein,
   (b) banding means around both said bearing parts and connecting the two parts of the body to form a circular opening within the semi-circular parts and coaxial bearing bores in the bearing parts,
   (c) an annular seat fitted into said circular opening and having diametrally opposite holes aligned with the bearing bores, a flow passage being defined by said seat,
   (d) a butterfly disc in said passage and provided with a stem that extends through one of the holes in the seat and is rotationally engaged in one of said bearing bores; and
   (e) a non-rotational stem coaxial with the mentioned stem and extending into the other hole in the seat,
   (f) the disc having a pilot extending into the latter hole.

2. A butterfly valve according to claim 1 in which the hole in the seat through which the stem on the disc extends is formed, in part, by a recess in the seat and, in part, by a filler insert, said stem being laterally insertable into said hole before the filler insert is assembled on the seat.

3. A butterfly valve according to claim 1 in which a handle is provided on the rotational stem beyond the end of the bearing thereof, and further provided with
   (a) two circumferentially spaced stop lugs on the bearing part of one of said body parts, and
   (b) a lug on the handle between the stop lugs to limit the rotational movement of the handle and of the butterfly disc forming part of the rotational stem.

4. A butterfly valve according to claim 3 in which the stop lugs are spaced circumferentially to limit adjusted movement of the valve disc between a fully closed and a fully open position.

5. A butterfly valve according to claim 1 in which the two parts of the body, when joined, are abutted on flat faces coincidental with the axis of the body, and a rubber coating is provided on at least one of said faces to seal between the body parts when connected by the mentioned banding means.

6. A butterfly valve according to claim 1 in which a lubricant fitting is provided on each diametrally directed bearing part of one of the body parts to lubricate the bores therein.

7. A butterfly valve according to claim 1 provided with ports in the non-rotational stem for flushing fluid to the interior of the valve.

8. A butterfly valve according to claim 7 in which check valve jets carried by the disc receive said flow of flushing fluid only when the disc is in valve-opening position.

References Cited

UNITED STATES PATENTS

| | | | |
|---|---|---|---|
| 2,912,218 | 11/1959 | Stillwagon | 251—306 |
| 3,048,363 | 8/1962 | Garrigan | 251—307 |
| 3,215,400 | 11/1965 | Muller | 251—306 |
| 3,228,653 | 1/1966 | Trimmer | 251—306 |

HENRY T. KLINKSIEK, Primary Examiner

U.S. Cl. X.R.

251—288, 367